United States Patent

Alexander et al.

[11] Patent Number: 6,095,095
[45] Date of Patent: Aug. 1, 2000

[54] CIRCULATING FLUIDIZED BED REACTOR WITH FLOORED INTERNAL PRIMARY PARTICLE SEPARATOR

[75] Inventors: Kiplin C. Alexander, Wadsworth; Felix Belin, Brecksville; Mikhail Maryamchik, Copley; David J. Walker, Wadsworth, all of Ohio

[73] Assignee: The Bacock & Wilcox Company, New Orleans, La.

[21] Appl. No.: 09/206,353

[22] Filed: Dec. 7, 1998

[51] Int. Cl.⁷ .................. B09B 3/00; B01D 45/02
[52] U.S. Cl. .................. 122/34; 122/4 D; 55/444; 110/245
[58] Field of Search .......... 122/4 D, 34; 55/444; 110/216, 245

[56] References Cited

U.S. PATENT DOCUMENTS

| | | | |
|---|---|---|---|
| 1,761,168 | 6/1930 | Andrews . | |
| 2,083,764 | 6/1937 | Weisgerber et al. | 183/110 |
| 2,163,600 | 7/1939 | How | 183/110 |
| 3,759,014 | 9/1973 | Van Dyken, II et al. | 55/96 |
| 4,165,717 | 8/1979 | Reh et al. | 122/4 D |
| 4,253,425 | 3/1981 | Gamble et al. | 122/4 D |
| 4,532,871 | 8/1985 | Van Gasselt et al. | 110/216 |
| 4,538,549 | 9/1985 | Stromberg | 122/4 D |
| 4,589,352 | 5/1986 | van Gasselt et al. | 110/216 |
| 4,640,201 | 2/1987 | Holmes et al. | 110/245 |
| 4,672,918 | 6/1987 | Engstrom et al. | 122/4 D |
| 4,679,511 | 7/1987 | Holmes et al. | 110/216 |
| 4,683,840 | 8/1987 | Morin | 122/4 D |
| 4,699,068 | 10/1987 | Engstrom | 110/216 |
| 4,708,092 | 11/1987 | Engstrom | 122/4 D |
| 4,717,404 | 1/1988 | Fore | 55/444 |
| 4,730,563 | 3/1988 | Thornblad | 110/216 |
| 4,732,113 | 3/1988 | Engstrom | 122/4 D |
| 4,770,237 | 9/1988 | Morin et al. | 165/104.16 |
| 4,796,546 | 1/1989 | Herstad et al. | 110/216 |
| 4,891,052 | 1/1990 | Belin et al. | 55/429 |
| 4,915,061 | 4/1990 | Garcia-Mallol | 122/4 D |
| 4,992,085 | 2/1991 | Belin et al. | 55/444 |
| 5,025,755 | 6/1991 | Eickvonder et al. | 122/4 D |
| 5,060,599 | 10/1991 | Chambert | 122/4 D |
| 5,117,770 | 6/1992 | Hassinen | 110/245 |
| 5,167,932 | 12/1992 | Ruottu | 422/146 |
| 5,343,830 | 9/1994 | Alexander et al. | 122/4 D |
| 5,363,812 | 11/1994 | Belin et al. | 122/4 D |
| 5,378,253 | 1/1995 | Daum et al. | 55/269 |
| 5,435,820 | 7/1995 | Daum et al. | 55/269 |
| 5,799,593 | 9/1998 | Belin et al. | 110/245 |
| 5,809,940 | 9/1998 | James et al. | 122/4 D |

*Primary Examiner*—Denise L. Ferensic
*Assistant Examiner*—Gregory A. Wilson
*Attorney, Agent, or Firm*—Eric Marich; Robert J. Edwards

[57] ABSTRACT

A CFB reactor or combustor having an impact type primary particle separator collects solids particles from a flow of flue gas/solids and returns the collected particles along an inclined or substantially horizontal planar floor to a bottom portion of the reactor or combustor for subsequent recirculation.

38 Claims, 7 Drawing Sheets

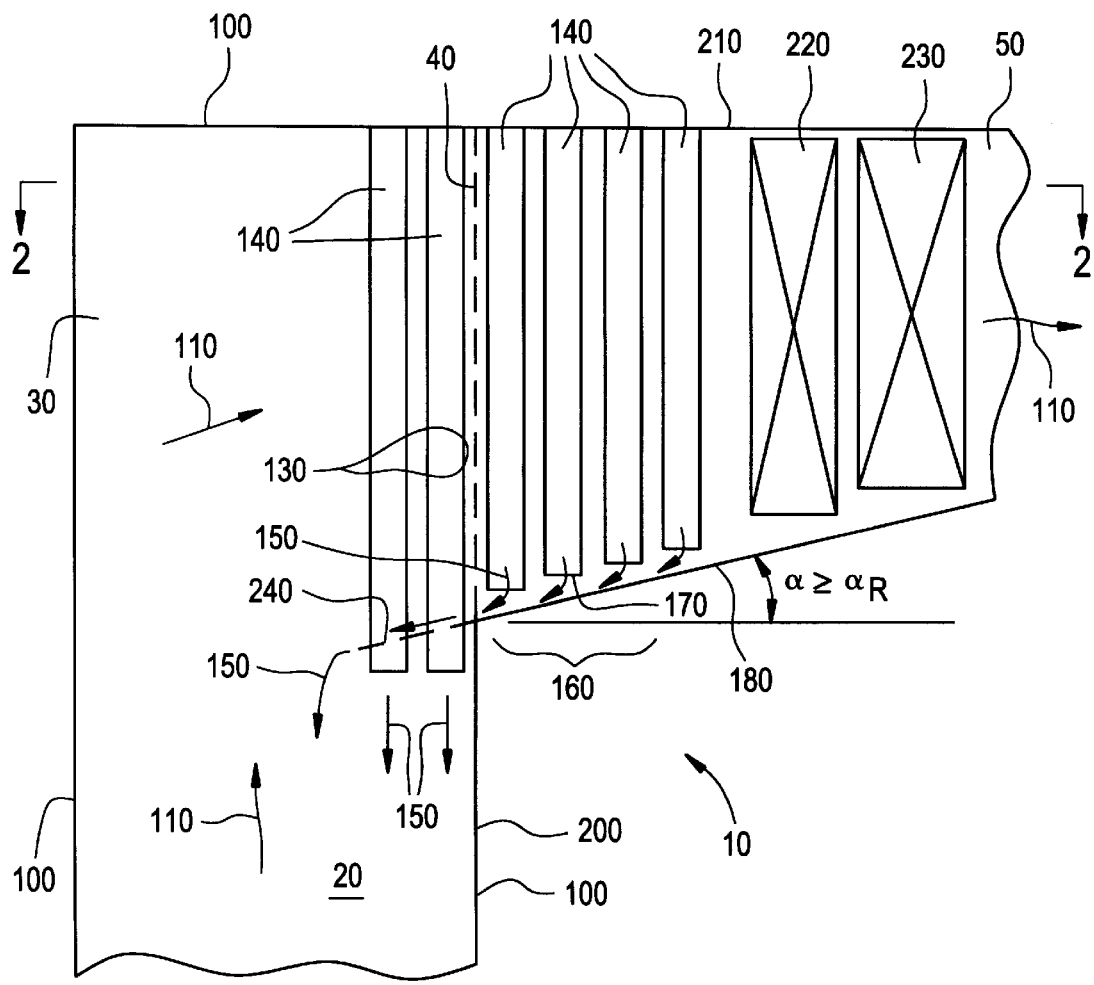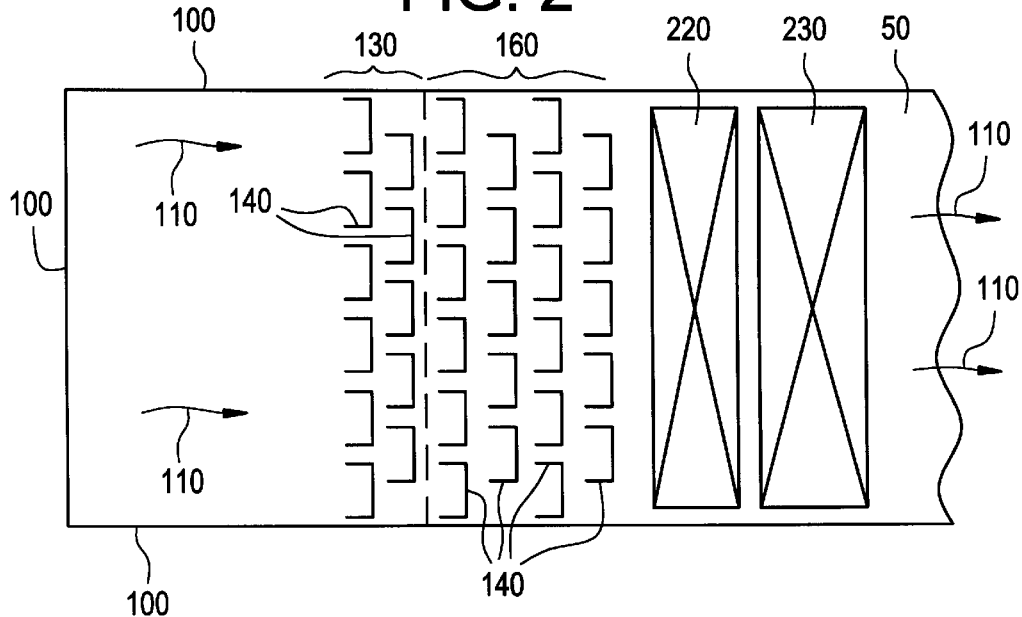

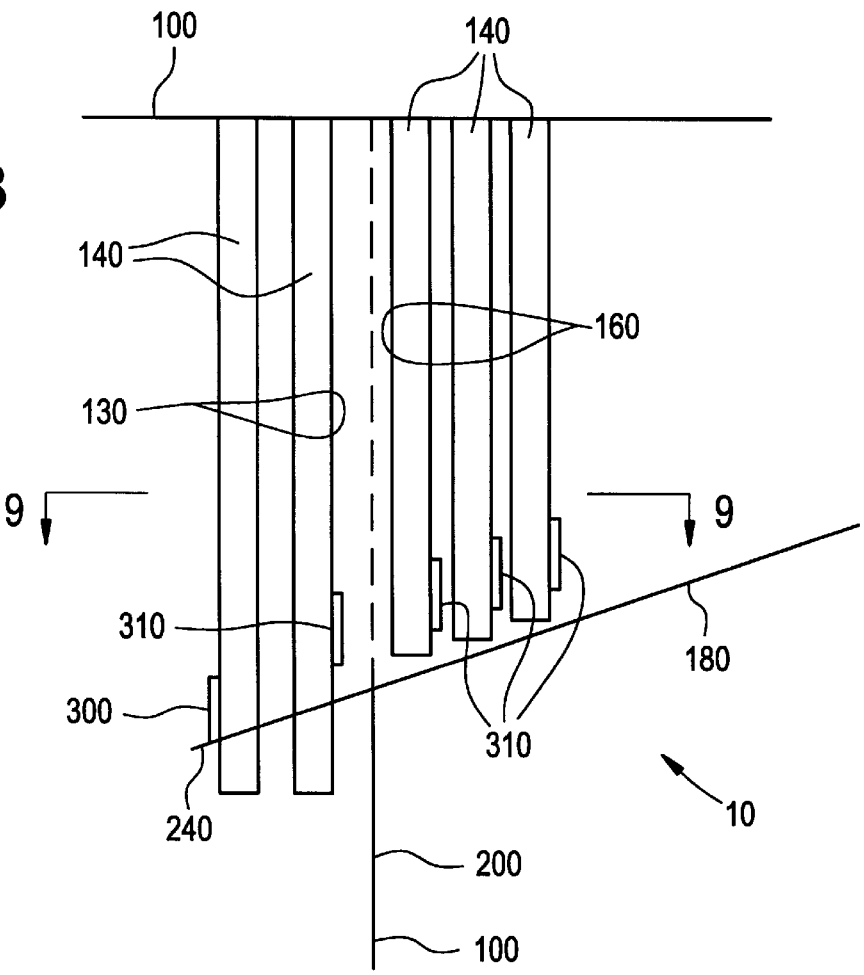
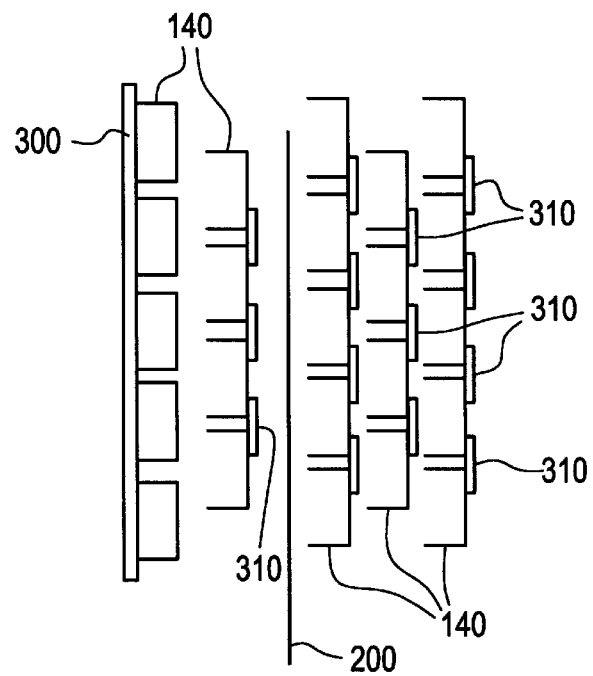

GROOVES OR CHANNELS

U-BEAMS IN ROW 2

U-BEAMS IN ROW 1

GROOVES OR CHANNELS

CIRCULATING FLUIDIZED BED REACTOR WITH FLOORED INTERNAL PRIMARY PARTICLE SEPARATOR

FIELD OF THE INVENTION

The present invention relates, in general, to circulating fluidized bed (CFB) reactors or combustors having impact type particle separators and, more particularly, to a CFB reactor or combustor having an improved impact type primary particle separator. Instead of providing a cavity means or hopper with discharge openings underneath the collector elements making up the impact type primary particle separator, a simple floor provides for internal return of all primary collected solids to a bottom portion of the reactor or combustor for subsequent recirculation.

BACKGROUND OF THE INVENTION

In CFB reactors or combustors, reacting and non-reacting solids are entrained within a reactor enclosure by an upward gas flow which carries the solids to an exit at an upper portion of the reactor enclosure. There, the solids are typically collected by an impact type primary particle separator, and returned to a bottom portion of the reactor enclosure either directly or through one or more conduits. The impact type primary particle separator at the reactor enclosure exit typically collects from 90% to 97% of the circulating solids. If required by the process, an additional solids collector may be installed downstream of the impact type primary particle separator to collect additional solids for eventual return to the reactor enclosure.

As disclosed in U.S. Pat. No. 5,343,830 to Alexander et al., the use of impact type particle separators in CFB reactors or combustors is well known. To the extent necessary to describe the general operation of CFB reactors and combustors, the reader is referred to U.S. Pat. No. 5,343,830 to Alexander et al., the text of which is hereby incorporated by reference as though fully set forth herein. In one of the earliest CFB designs, an external, impact type primary particle separator having a plurality of impingement members arranged in staggered rows was used in combination with a non-mechanical L-valve and a secondary (multiclone) particle separator. The rows of staggered impingement members discharged all of their collected solids into a storage hopper located underneath them, and these collected solids were returned to the bottom portion of the reactor enclosure via the L-valve.

Later CFB designs employed additional rows of staggered impingement members which were positioned upstream (with respect to a direction of flue gas and solids flow through the apparatus) of the impingement members associated with the storage hopper and its L-valve. As disclosed in U.S. Pat. No. 4,992,085 to Belin et al., the text of which is hereby incorporated by reference as though fully set forth herein, a plurality of such impingement members are located within an upper portion of the reactor enclosure, arranged in at least two staggered rows. The impingement members hang and extend vertically across a width of the reactor exit, with collected solids falling unobstructed and unchanneled underneath these collecting impingement members along a rear enclosure wall of the CFB reactor or combustor. An important element of these "in-furnace" collecting impingement members, or "in-furnace U-beams" as they are generally referred to, is a baffle plate near a lower end of these impingement members which enhances their collection efficiency.

As disclosed in the aforementioned Alexander et al. '830 patent, CFB reactors or combustors are known wherein the two or more rows of impingement members located within the furnace or reactor enclosure are followed by a second array of staggered impingement members which further separate particles from the gas stream, and return them via cavity means and particle return means without external and internal recycle conduits.

It is apparent that a CFB reactor or combustor comprising an even more simple construction would be less costly and would be welcomed by industry.

FIELD OF THE INVENTION

The present invention relates generally to the field of circulating fluidized bed (CFB) reactors or combustors and provides a simpler and lower cost impact type primary particle separator. In particular, instead of providing a cavity means or hopper with discharge openings underneath the collector elements making up the impact type primary particle separator, a simple floor provides for internal return of all primary collected solids to a bottom portion of the reactor or combustor for subsequent recirculation.

In its simplest form, the present invention comprises two or more rows of staggered impact type particle separators whose lower ends extend to or proximate to a simple, substantially planar floor. The floor can be inclined towards the reactor enclosure, towards a downstream direction with respect to a flow of flue gas/solids through the CFB, in both directions, or even horizontal. The impact type particle separators operate in known fashion, collecting solids from the flue gas/solids flowing through a passage or flue containing the impact type particle separators and conducting them to their lower ends. These collected solids are then removed by gravity from the flue by one of the following modes.

If the floor is inclined at some angle with respect to horizontal so that the floor is sloped towards a reactor enclosure of the CFB, the separated solids particles will slide down the floor and into the reactor enclosure along a rear enclosure wall thereof. If the floor is inclined so that it is downward sloping towards a downstream direction with respect to a flow of flue gas/solids through the passage or flue, the separated solids particles will slide down the floor in the direction of flue gas/solids flow where they can be collected in a downstream cavity, hopper, or removal trough for collection and eventual return to a bottom portion of the reactor enclosure. In some cases, the floor may be provided with a peak to facilitate solids particles sliding down both towards the reactor enclosure and towards a downstream direction. In any event, the floor's angle of inclination, $\alpha$, will generally be selected so that it is equal to or greater than the angle of repose $\alpha_R$ for such separated solids.

However, the concept of the present invention is also applicable even if the floor is horizontal. The separated solids collected by the particle separators will begin to build up into a pile on such a horizontal floor until a slope of the pile reaches the angle of repose $\alpha_R$ for such separated solids, at which point the solids will then begin to slide down along the pile, either towards the reactor enclosure or in the direction of flue gas/solids flow. Particles sliding down the floor back towards the reactor enclosure are directly returned for subsequent recirculation, while particles sliding down the floor in the direction of flue gas/solids flow will be collected in a cavity, hopper, or removal trough for collection and eventual return to a bottom portion of the reactor enclosure.

In cases where the collected solids particles flow down towards the reactor enclosure, a flue gas/solids deflector means can be used to increase the fraction of collected solids particles which slide down the floor and into the reactor enclosure along the rear enclosure wall. In cases where the collected solids particles flow in the direction of flue gas/solids flow, deflector means may or may not be used to enhance the flow of separated solids particles along the floor to the downstream cavity, hopper, or removal trough.

The floored internal impact type primary particle separator according to the present invention can be used with or without the upstream, in-furnace U-beams.

Accordingly one aspect of the present invention is drawn to an improved CFB reactor or combustor arrangement having impact type particle separators for separating solids particles from a flow of flue gas/solids flowing through a reactor enclosure of the CFB reactor, comprising: a reactor enclosure having an exit opening; a group of at least two rows of staggered impact type particle separators located upstream of the exit opening with respect to the flow of flue gas/solids; a second group of at least two rows of staggered impact type particle separators located downstream of the exit opening; and a floor located below the second group of particle separators.

Another aspect of the present invention is drawn to an improved CFB reactor or combustor arrangement having impact type particle separators for separating solids particles from a flow of flue gas/solids flowing through a reactor enclosure of the CFB reactor, comprising: a reactor enclosure having an exit opening; a group of at least two rows of staggered impact type particle separators located downstream of the exit opening with respect to the flow of flue gas/solids; and a floor located below the group of particle separators.

Yet still another aspect of the present invention is drawn to an improved CFB reactor or combustor arrangement having impact type particle separators for separating solids particles from a flow of flue gas/solids flowing through a reactor enclosure of the CFB reactor, comprising: a reactor enclosure having an exit opening; at least two rows of staggered impact type particle separators, at least one row located upstream of the exit opening and at least one row located downstream of the exit opening with respect to the flow of flue gas/solids; and a floor located below the at least one row of particle separators located downstream of the exit opening.

The various features of novelty which characterize the invention are pointed out with particularity in the claims annexed to and forming a part of this disclosure. For a better understanding of the invention, its operating advantages and specific benefits attained by its uses, reference is made to the accompanying drawings and descriptive matter in which a preferred embodiment of the invention is illustrated.

BRIEF DESCRIPTION OF THE DRAWINGS

In the drawings:

FIG. 1 is a schematic sectional side elevation view of a portion of a circulating fluidized bed (CFB) reactor or combustor according to a first embodiment of the invention;

FIG. 2 is a schematic sectional plan view of FIG. 1 viewed in the direction of arrows 2—2;

FIG. 8 is a schematic sectional side view of a second embodiment of a gas/solids deflector means which may be used at a lower end of the staggered impact type particle separator elements;

FIG. 9 is a schematic sectional plan view of FIG. 8 taken in the direction of arrows 9—9.

DESCRIPTION OF THE PREFERRED EMBODIMENTS

Figure 3:
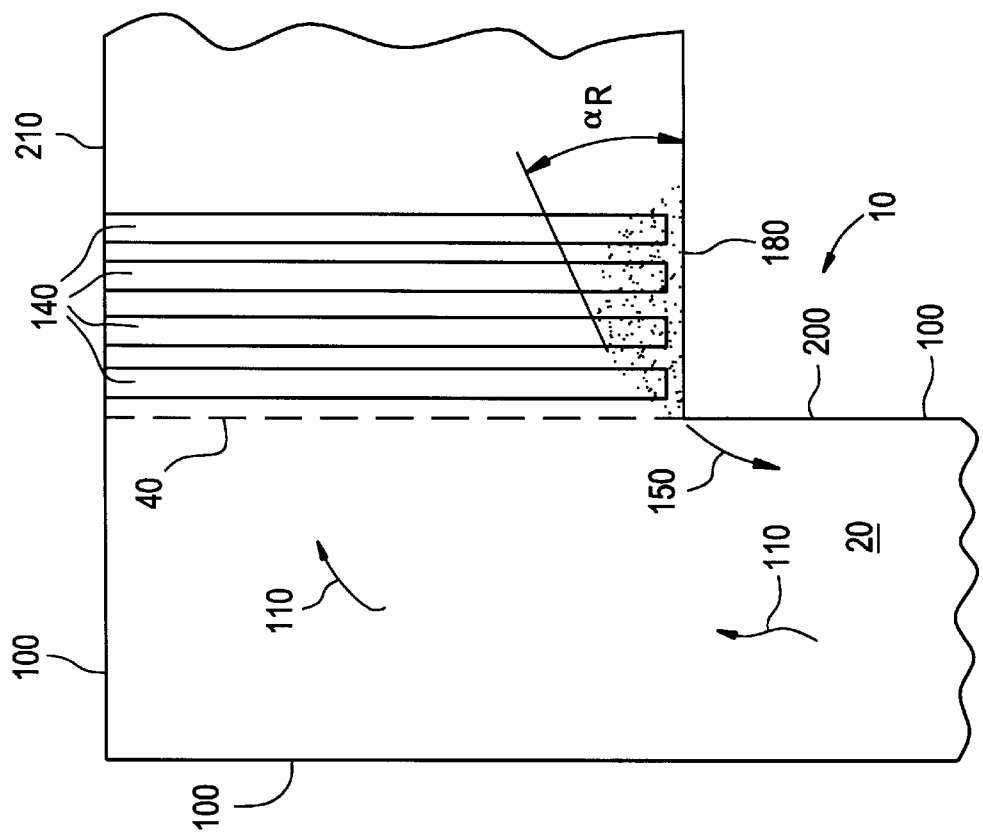
FIG. 3 is a schematic sectional side elevation view of a portion of a CFB reactor or combustor according to a second embodiment of the invention.

As used herein, the term CFB combustor refers to a type of CFB reactor where a combustion process takes place. While the present invention is directed particularly to boilers or steam generators which employ CFB combustors as the means by which the heat is produced, it is understood that the present invention can readily be employed in a different kind of CFB reactor. For example, the invention could be applied in a reactor that is employed for chemical reactions other than a combustion process, or where a gas/solids mixture from a combustion process occurring elsewhere is provided to the reactor for further processing, or where the reactor merely provides an enclosure wherein particles or solids are entrained in a gas that is not necessarily a byproduct of a combustion process.

Referring generally to the drawings, wherein like reference numerals represent the same or functionally similar elements throughout the several drawings, and to FIGS. 1 and 2 in particular, there is shown a circulating fluidized bed (CFB) reactor or combustor, generally designated 10, comprising a reactor enclosure 20 having an upper portion 30, an exit opening 40, and a convection pass 50. The front of the CFB reactor enclosure is defined as the left hand side of FIGS. 1 and 2; the rear is the right hand sides of these FIGS, and the width of the CFB reactor enclosure 20 is perpendicular to the plane of FIG. 1. The reactor enclosure 20 is typically rectangular in cross-section and is defined by enclosure walls 100. Enclosure walls 100 are usually fluid cooled, being typically comprised of water and/or steam conveying tubes separated from one another by a steel membrane to achieve a gas-tight reactor enclosure 20. A flue gas/solids mixture 110 produced by the CFB combustion process occurring in a lower portion of the reactor enclosure 20 flows upwardly through the upper portion 30 and eventually out the exit opening 40 and into the convection pass 50. As the flue gas/solids mixture 110 travels along this path, it passes across several solids particle and heat removal stages, as will be herein described, before being passed to the atmosphere.

Located in the upper portion 30 of the reactor enclosure 20, in the direction of the flue gas/solids flow 110 and upstream of the exit opening 40, is a first group 130 (one or more rows, preferably two rows) of staggered impact type particle separators 140. The particle separators 140 are non-planar; they may be U-shaped, E-shaped, W-shaped or any other shape which presents a cupped or concave surface configuration to the flow of incoming flue gas/solids 110. As described earlier, since the first group 130 of impact type particle separators are upstream of the exit opening 40, this first group 130 may also be referred to as the in-furnace U-beams 130. For the sake of convenience, the staggered impact type particle separators 140 will be generally referred to in the balance of the description as U-beams 140. The U-beams 140 are staggered with respect to one another such that the flue gas/solids flow 110 passes through them enabling the entrained solids particles to strike them and be collected in their cupped or concave portion, and causing the collected particles (generally referred to as 150, regardless of which separator elements 140 collect them) collected by the first group 130 to free fall internally and directly down along the U-beams towards a bottom portion of the reactor enclosure 20. U-beams 140 also extend fully across the exit opening 40. U-beams 140 are typically made of stainless steel due to the high temperature environment.

Positioned just downstream of the exit opening 40 is a second group 160 of impact type particle separators or U-beams 140, (also referred to as the primary impact type particle separators 160). The U-beams 140 in this second group 160 of at least two rows of staggered impact type particle separators (preferably 4 rows), located downstream of the exit opening 40, also collect particles 150 from the flue gas/solids flow 110. However, in contrast to the known arrangements wherein lower ends 170 of such U-beams 140 making up the second group 160 extend into a cavity below them which is used to temporarily collect and return collected solids particles back to the reactor enclosure 20, the CFB reactor 10 according to the present invention is merely provided with a floor 180 having no apertures or openings therein for particles to fall through.

As illustrated in FIG. 3, the floored internal impact type primary particle separator 160 according to the present invention can be used without the upstream group of in-furnace U-beams 130, but it is preferred that they be employed to enhance solids particles 150 collection efficiency. Similarly, while at least two rows of staggered impact type particle separators or U-beams 140 are required, the at least two rows can be located downstream of the exit opening 40, or at least one row can be located upstream of the exit opening 40 and at least one row can be located downstream of the exit opening 40.

Figure 4:
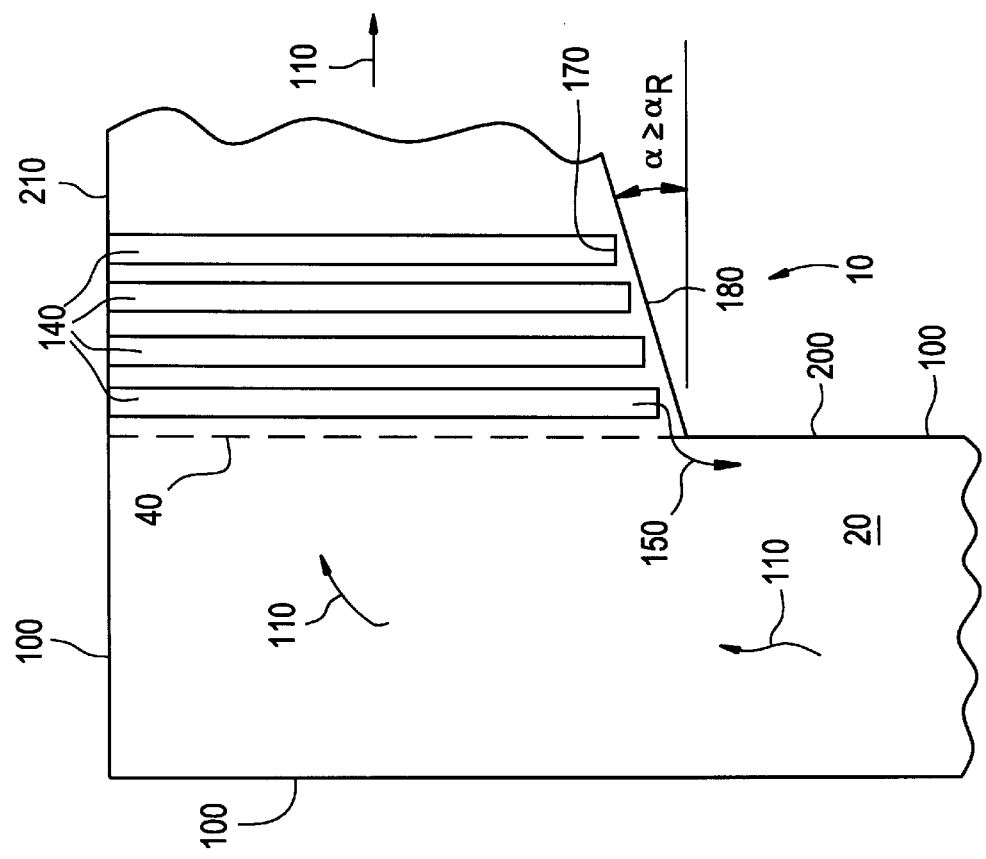
FIG. 4 is a schematic sectional side elevation view of a portion of a CFB reactor or combustor according to a third embodiment of the invention.
Figure 5:
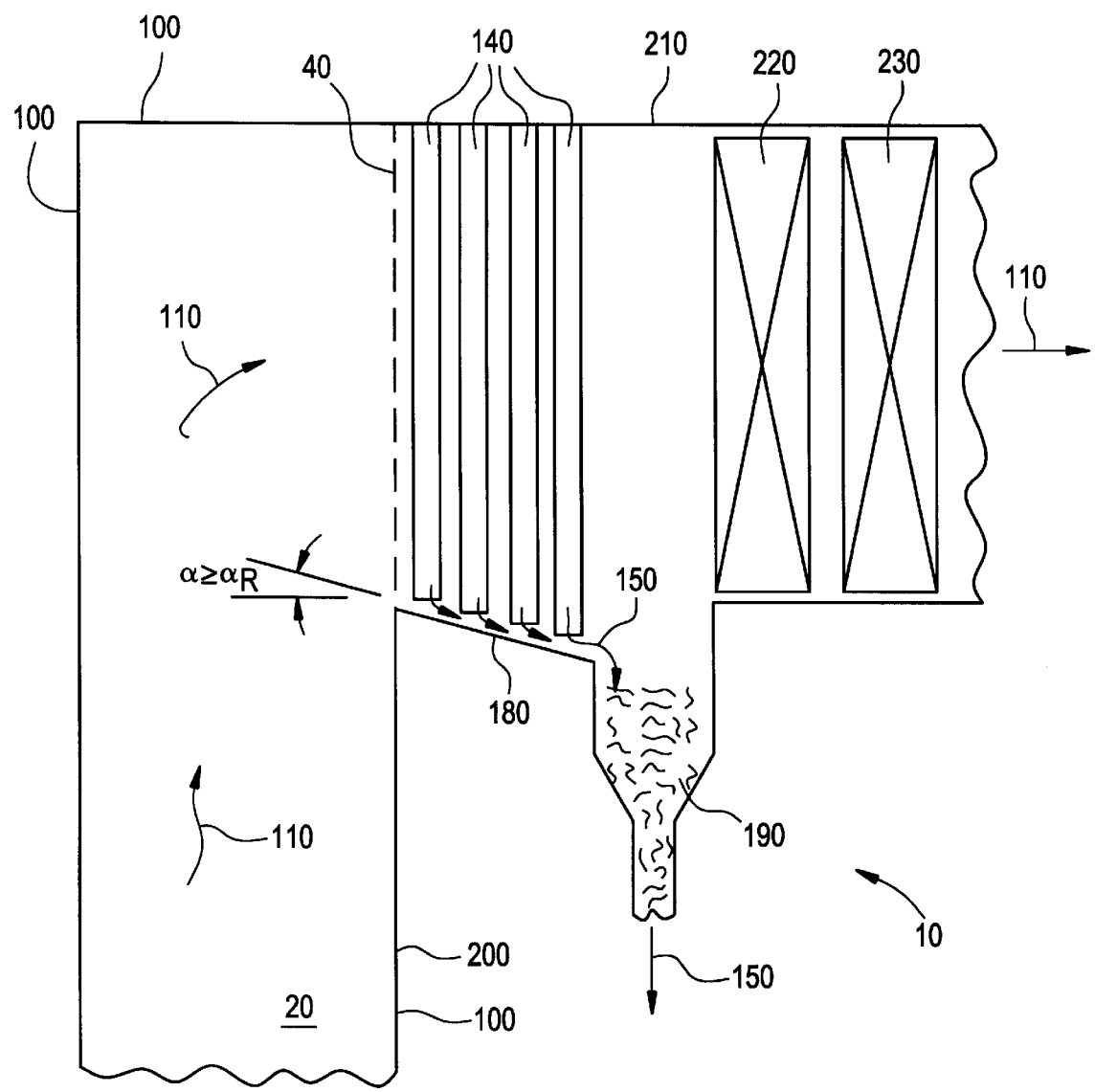
FIG. 5 is a schematic sectional side elevation view of a portion of a CFB reactor or combustor according to a fourth embodiment of the invention.
Figure 5A:
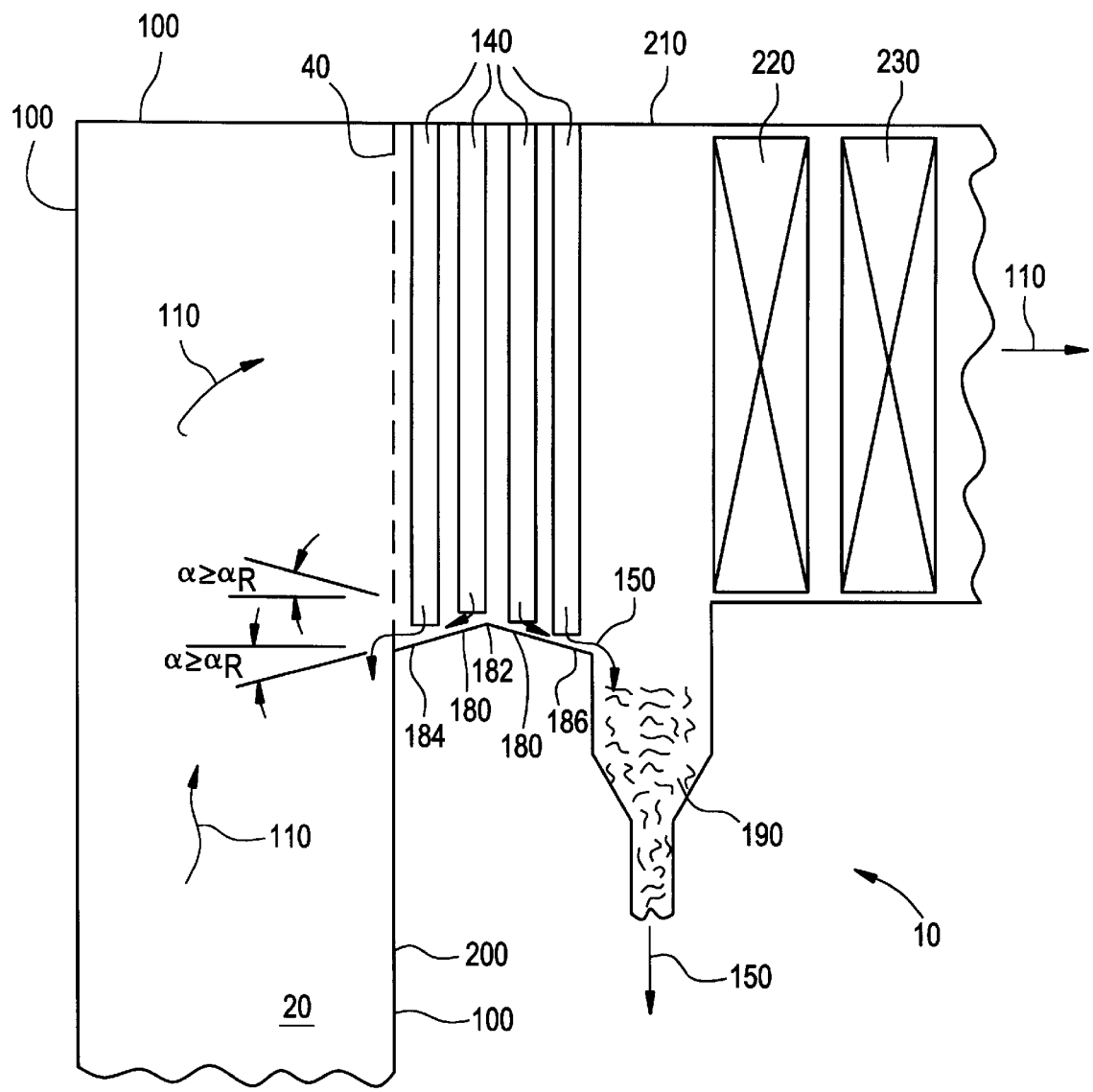
FIG. 5A is a schematic sectional side elevation view of a portion of a CFB reactor or combustor according to a fifth embodiment of the invention.

Floor 180 may be and is preferably inclined so that collected solids particles 150 slide along floor 180 towards the reactor enclosure 20. However, floor 180 may be substantially horizontal as illustrated in FIG. 4, or it may be inclined so that collected solids particles 150 slide along floor 180 in the direction of flue gas/solids flow 110 where they can be collected in a downstream cavity, hopper or trough 190 as illustrated in FIG. 5 for collection and eventual return to a bottom portion of the reactor enclosure. If desired, floor 180 may even be provided with a peak 182 such that it has not only a first portion 184 inclined so that collected solids particles 150 slide along floor 180 towards the reactor enclosure 20, but also a second portion 186 inclined so that collected solids particles 150 slide along floor 180 in the direction of flue gas/solids flow 110 where they can be collected in the downstream cavity, hopper or trough 190 as illustrated in FIG. 5A for collection and eventual return to a bottom portion of the reactor enclosure.

Figure 10:
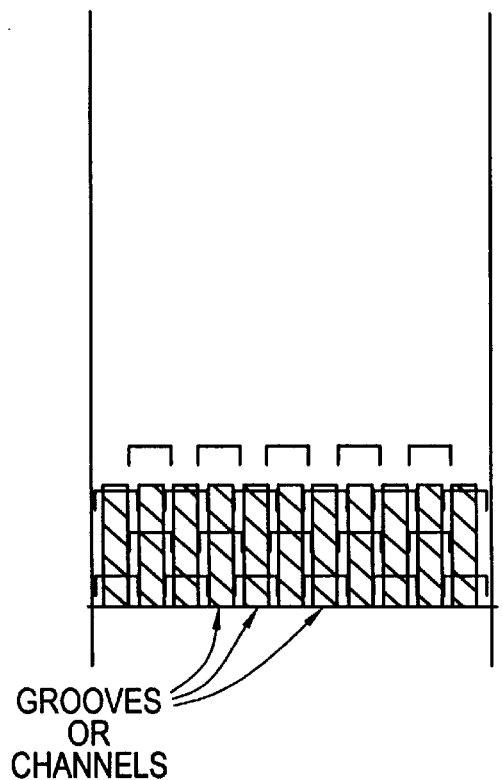
FIGS. 10 and 11 are schematic plan and elevation views, respectively, of an embodiment of the floor provided with channels or grooves.
Figure 11:
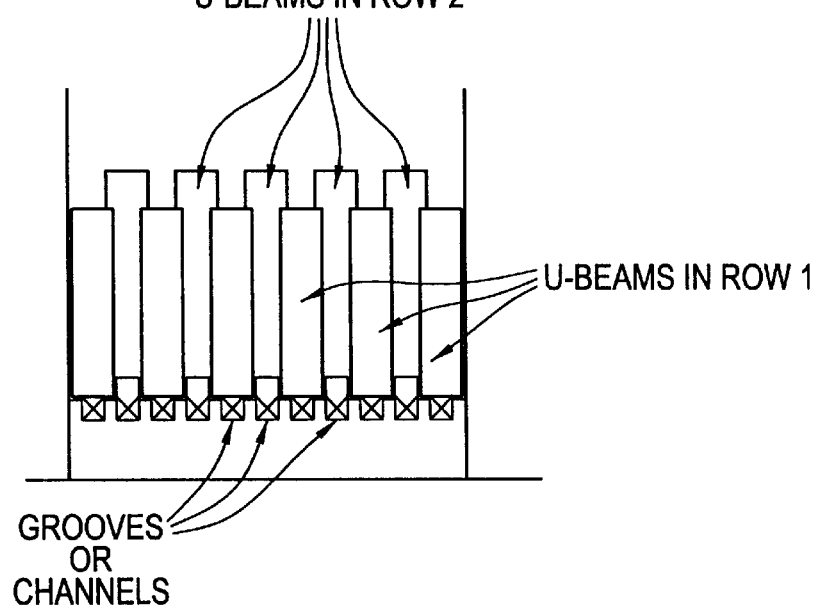

In any event, where floor 180 is inclined, floor 180's angle of inclination, $\alpha$, will generally be selected so that it is equal to or greater than the angle of repose $\alpha_R$ for such separated solids. Floor 180 is preferably substantially planar in construction, but if it is inclined it may be provided with a series of channels or grooves therein along which collected solids particles 150 may flow or slide. See FIGS. 10 and 11.

The floored impact type particle separator concept of the present invention is also applicable even if the floor 180 is horizontal or substantially horizontal (FIG. 4). The separated solids 150 collected by the second group of particle separators 160 will begin to build up into a pile on such a horizontal floor 180 until a slope of the pile reaches the angle of repose $\alpha_R$ for such separated solids 150, at which point the solids 150 will then begin to slide down along the pile, either towards the reactor enclosure 20 or in the direction of flue gas/solids flow 110. Particles 150 sliding down the floor 180 back towards the reactor enclosure 20 are directly returned for subsequent recirculation, while particles 150 sliding down the floor 180 in the direction of flue gas/solids flow 180 will be collected in the downstream cavity, hopper, or removal trough 190 for collection and eventual return to a bottom portion of the reactor enclosure 20.

Figure 6:
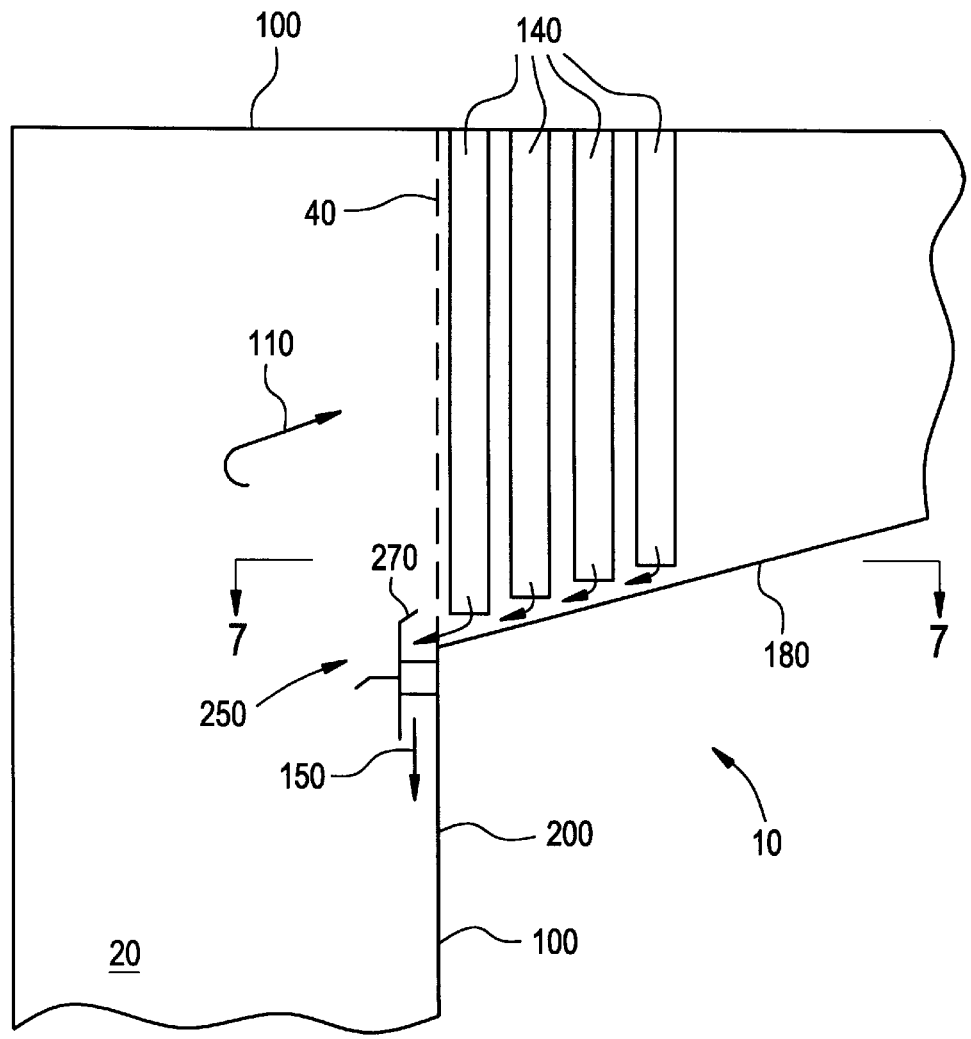
FIG. 6 is a schematic sectional side elevation view of a first embodiment of a gas/solids deflector means which may be used in the CFB reactor or combustor at a lower end of the staggered impact type particle separator elements.
Figure 7:
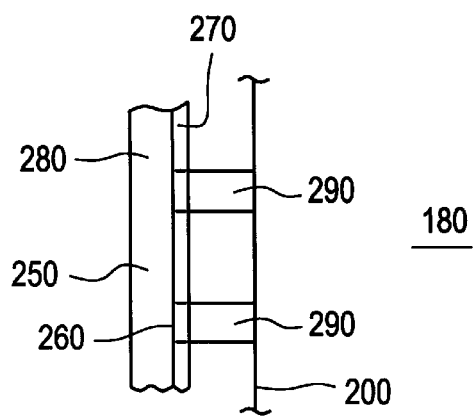
FIG. 7 is a schematic sectional plan view of FIG. 6 taken in the direction of arrows 7—7, the U-beams 140 being omitted for clarity.

In cases where the collected solids particles 150 flow down the floor 180 towards the reactor enclosure 20, a flue gas/solids deflector means can be used to increase the fraction of collected solids particles which slide down the floor 180 and into the reactor enclosure 20 along the rear enclosure wall 200. In cases where the collected solids particles 150 flow in the direction of flue gas/solids flow 110, deflector means may or may not be used to enhance the flow of separated solids particles 180 along the floor 180 to the downstream cavity, hopper, or removal trough 190, Referring to FIGS. 6 and 7, one embodiment of the flue gas/solids deflector means, generally referred to as 250, comprises a plate 260 having a lip 270 at an upper portion thereof, a substantially horizontal baffle 280 extending from the plate 260, and standoff means 290 for securing the plate 260 to the rear wall 200 of the reactor enclosure 20. Preferably the flue gas/solids deflector means is positioned at a location proximate to an intersection of the floor 180 and the rear enclosure wall 200.

Referring to FIGS. 8 and 9, another embodiment of the flue gas/solids deflector means merely employs an arrangement of plate 300, 310 secured, such as by welding, to lower ends of both the in-furnace U-beams 140 and the U-beams 140 comprising the second group of particle separators 160. As illustrated, a continuous plate 300 might be placed at the front of the first in-furnace U-beams 140, while separate plates 310 might be employed at the rear of successive U-beams 140.

The U-beams 140 making up the second group 160 are preferably the same design as those comprising the first group 130 and preferably extend to the floor 180, but consideration must be given to the fact that the U-beams 140 could expand or "grow" downwardly as the operating temperature in the CFB reactor increases. Providing clearance between the lower ends 170 of the U-beams 140 comprising the second group 160 and the floor 180 is one way to prevent contact during operation. However, if that approach is desired or acceptable, a balance must be struck between providing adequate clearance and too much clearance because the collected solids particles 150 could bypass the lower ends 170 of the U-beams 140, resulting in their not being returned to the reactor enclosure 20 for subsequent recirculation. Alternatively, cooling of such U-beams 140 might be provided to minimize or control such thermal expansion during operation, such as but not limited to the use of indirect cooling as disclosed in U.S. Pat. No. 5,809,940 to James et al., or by providing cooled U-beam 140 structures such as but not limited to those disclosed in U.S. Pat. Nos. 5,378,253 and 5,435,820 to Daum et al. Still further, a floor 180 or roof 210 structure could be employed which fixes one end of the U-beam 140 and allows for a "slip-fit" at the other, or which allows for movement at both ends, or if contact is determined to be relatively unobjectionable, a floor 180 structure wherein the U-beams 140 touch and/or are actually embedded in the floor 180 could be employed.

Some of the reactor enclosure tubes 100 which form a rear wall 200 of the reactor enclosure 20 extend upwardly towards a roof 210 of the convection pass 50 to form what is referred to in the art as a "screen" at the exit opening 40. The fluid-cooled tubes forming this screen are generally laterally spaced apart from one another, forming gas lanes (not shown) through which the flue gas/solids 110 flows. The floor 180 is typically cooled, and it may be formed by some of the fluid-cooled enclosure tubes 100 or by other fluid-cooled tubes.

With reference again to FIGS. 1 and 2, and continuing through the convection pass 50 in the direction of flue gas/solids 110 flow, banks of tubes comprising heating surfaces such as superheater, reheater, boiler (water/steam), or even economizer surface, schematically shown in FIGS. 1 and 2 as 220 and 230, may be provided. The flue gas/solids 110 passing across these banks of tubes 220, 230 gives up a portion of the heat contained therein to the working fluid within the tubes comprising these tube banks 220, 230 to achieve the thermodynamic work required by any steam turbine or other process (not shown) associated with the CFB reactor or combustor 10. After passing across these banks of tubes 220, 230, the flue gas/solids flow 110 may be provided to further downstream heating surfaces (not shown) and to additional particulate collection devices (also not shown).

The present invention minimizes or eliminates the inefficiencies caused by gas-bypass-induced reentrainment of solids through a discharge hopper or cavity located beneath the primary impact type particle separators 160. This means that additional rows of U-beams 140 may be added in this group 160, beyond the 4 or 5 rows typically employed, to increase particle collection efficiency.

Further, the configurations of FIGS. 4, 5 and 5A can be used where it is desirable to remove the collected solids 150 from the process or to route the collected solids back to the reactor enclosure 20 via an external conduit (not shown) or possibly to external devices such as an external fluidized bed heat exchanger (also not shown).

While a specific embodiment of the invention has been shown and described in detail to illustrate the application of the principles of the invention, it will be understood that the invention may be embodied otherwise without departing from such principles. For example, the present invention may be applied to new construction involving CFB reactors or combustors, or to the repair, replacement, or modification of existing CFB reactors or combustors. In some embodiments of the invention, certain features of the invention may be used to advantage without a corresponding use of other features. Accordingly, all such changes embodiments properly fall within the scope and equivalents of the following claims.

We claim:

1. An improved CFB reactor or combustor arrangement having impact type particle separators for separating solids particles from a flow of flue gas/solids flowing through a reactor enclosure of the CFB reactor, comprising:
   a reactor enclosure having an exit opening;
   a group of at least two rows of staggered impact type particle separators located upstream of the exit opening with respect to the flow of flue gas/solids;
   a second group of at least two rows of staggered impact type particle separators located in a passage downstream of the exit opening, the flue gas/solids flowing through the passage; and
   a floor of the passage for returning particles collected from the flow of flue gas/solids, the floor located below the second group of particle separators.

2. The improved CFB reactor or combustor arrangement of claim 1, wherein the floor is inclined at an angle with respect to horizontal so that the floor is sloped towards the reactor enclosure to cause solids particles collected by the second group of particle separators to slide down the floor towards the reactor enclosure.

3. The improved CFB reactor or combustor arrangement of claim 1, wherein the floor is inclined at an angle with respect to horizontal so that the floor is sloped towards a downstream direction with respect to the flow of flue gas/solids through the reactor enclosure to cause solids particles collected by the second group of particle separators to slide down the floor in the downstream direction.

4. The improved CFB reactor or combustor arrangement of claim 3, further comprising means for receiving collected solids particles which slide down the floor in the downstream direction.

5. The improved CFB reactor or combustor arrangement of claim 4, wherein the means for receiving collected solids particles comprises one of a cavity, hopper, and removal trough.

6. The improved CFB reactor or combustor arrangement of claim 1, wherein the floor is substantially horizontal.

7. The improved CFB reactor or combustor arrangement of claim 1, wherein the floor is substantially planar.

8. The improved CFB reactor or combustor of claim 1, wherein the floor is inclined at an angle $\alpha$ with respect to horizontal.

9. The improved CFB reactor or combustor of claim 8, wherein the angle $\alpha$ of inclination of the floor is equal to or greater than an angle of repose $\alpha_R$ of the collected solid particles.

10. The improved CFB reactor or combustor of claim 8, wherein the floor is provided with one of a series of channels and grooves along which collected solids particles may flow or slide.

11. The improved CFB reactor or combustor arrangement of claim 8, further comprising flue gas/solids deflector means associated with the particle separators to reduce reentrainment of collected solids particles.

12. The improved CFB reactor or combustor arrangement of claim 11, wherein the flue gas/solids deflector means comprises a plate having a lip at an upper portion thereof, a substantially horizontal baffle extending from the plate, and standoff means for securing the plate to a rear wall of the reactor enclosure at a location proximate to an intersection of the floor and the rear enclosure wall.

13. The improved CFB reactor or combustor arrangement of claim 11, wherein the flue gas/solids deflector means comprises an arrangement of plate secured to lower ends of the impact type particle separators.

14. The improved CFB reactor or combustor arrangement of claim 1, further comprising a convection pass and heat transfer surface located therein.

15. The improved CFB reactor or combustor arrangement of claim 14, wherein the heat transfer surface comprises at least one of superheater surface, reheater surface, boiler surface and economizer surface.

16. The improved CFB reactor or combustor arrangement of claim 1, wherein the impact type particle separators comprise U-beams.

17. The improved CFB reactor or combustor arrangement of claim 1, wherein the impact type particle separators comprise non-planar elements which are U-shaped, E-shaped, W-shaped or any other shape which presents a cupped or concave surface configuration to the flow of flue gas/solids.

18. The improved CFB reactor or combustor arrangement of claim 1, wherein the floor is provided with a peak such that it is provided with a first portion inclined at an angle with respect to horizontal so that the floor is sloped towards the reactor enclosure to cause solids particles collected by the second group of particle separators to slide down the first portion of the floor towards the reactor enclosure, and a second portion inclined at an angle with respect to horizontal so that the floor is sloped towards a downstream direction with respect to the flow of flue gas/solids through the reactor enclosure to cause solids particles collected by the second group of particle separators to slide down the second portion of the floor in the downstream direction.

19. An improved CFB reactor or combustor arrangement having impact type particle separators for separating solids particles from a flow of flue gas/solids flowing through a reactor enclosure of the CFB reactor, comprising:

a reactor enclosure having an exit opening;

a group of at least two rows of staggered impact type particle separators located in a passage downstream of the exit opening with respect to the flow of flue gas/solids through the passage; and a floor of the passage for returning particles collected from the flow of flue gas/solids, the floor located below the group of particle separators.

20. An improved CFB reactor or combustor arrangement having impact type particle separators for separating solids particles from a flow of flue gas/solids flowing through a reactor enclosure of the CFB reactor, comprising:

a reactor enclosure having an exit opening;

at least two rows of staggered impact type particle separators, at least one row located upstream of the exit opening and at least one row located in a passage downstream of the exit opening with respect to the flow of flue gas/solids through the passage; and a floor of the passage for returning particles collected from the flow of flue gas/solids, the floor located below the at least one row of particle separators located downstream of the exit opening.

21. The improved CFB reactor or combustor arrangement of claims 19 or 20, wherein the floor is inclined at an angle with respect to horizontal so that the floor is sloped towards the reactor enclosure to cause solids particles collected by the particle separators to slide down the floor towards the reactor enclosure.

22. The improved CFB reactor or combustor arrangement of claims 19 or 20, wherein the floor is inclined at an angle with respect to horizontal so that the floor is sloped towards a downstream direction with respect to the flow of flue gas/solids through the reactor enclosure to cause solids particles collected by the particle separators to slide down the floor in the downstream direction.

23. The improved CFB reactor or combustor arrangement of claim 22, further comprising one of a cavity, hopper, and removal trough means for receiving collected solids particles which slide down the floor in the downstream direction.

24. The improved CFB reactor or combustor arrangement of claims 19 or 20, wherein the floor is substantially horizontal.

25. The improved CFB reactor or combustor arrangement of claims 19 or 20, wherein the floor is substantially planar.

26. The improved CFB reactor or combustor of claims 19 or 20, wherein the floor is inclined at an angle $\alpha$ with respect to horizontal.

27. The improved CFB reactor or combustor of claim 26, wherein the angle $\alpha$ of inclination of the floor is equal to or greater than an angle of repose $\alpha_R$ of the collected solids particles.

28. The improved CFB reactor or combustor of claim 26, wherein the floor is provided with one of a series of channels and grooves along which collected solids particles may flow or slide.

29. The improved CFB reactor or combustor arrangement of claim 26, further comprising flue gas/solids deflector means associated with the particle separators to reduce reentrainment of collected solids particles.

30. The improved CFB reactor or combustor arrangement of claim 29, wherein the flue gas/solids deflector means comprises a plate having a lip at an upper portion thereof, a substantially horizontal baffle extending from the plate, and standoff means for securing the plate to a rear wall of the reactor enclosure at a location proximate to an intersection of the floor and the rear enclosure wall.

31. The improved CFB reactor or combustor arrangement of claim 29, wherein the flue gas/solids deflector means comprises an arrangement of plate secured to lower ends of the impact type particle separators.

32. The improved CFB reactor or combustor arrangement of claims 19 or 20, further comprising a convection pass and at least one of superheater surface, reheater surface, boiler surface and economizer surface located therein.

33. The improved CFB reactor or combustor arrangement of claims 19 or 20, wherein the impact type particle separators comprise U-beams.

34. The improved CFB reactor or combustor arrangement of claim 33, wherein the impact type particle separators comprise non-planar elements which are U-shaped, E-shaped, W-shaped or any other shape which presents a cupped or concave surface configuration to the flow of flue gas/solids.

35. The improved CFB reactor or combustor arrangement of claims 19 or 20, wherein the floor is provided with a peak such that it is provided with a first portion inclined at an angle with respect to horizontal so that the floor is sloped towards the reactor enclosure to cause solids particles collected by the particle separators to slide down the first portion of the floor towards the reactor enclosure, and a second portion inclined at an angle with respect to horizontal so that the floor is sloped towards a downstream direction with respect to the flow of flue gas/solids through the reactor enclosure to cause solids particles collected by the particle separators to slide down the second portion of the floor in the downstream direction.

36. An improved CFB reactor or combustor arrangement having impact type particle separators for separating solids particles from a flow of flue gas/solids flowing through a reactor enclosure of the CFB reactor, comprising:

a reactor enclosure having an exit opening;

a group of at least two rows of staggered impact type particle separators located upstream of the exit opening with respect to the flow of flue gas/solids;

a second group of at least two rows of staggered impact type particle separators located downstream of the exit opening; and a floor located below the second group of particle separators, wherein the floor is provided with a peak such that it is provided with a first portion inclined at an angle with respect to horizontal so that the floor is sloped towards the reactor enclosure to cause solids particles collected by the second group of particle separators to slide down the first portion of the floor towards the reactor enclosure, and a second portion inclined at an angle with respect to horizontal so that the floor is sloped towards a downstream direction with the respect to the flow of flue gas/solids through the reactor enclosure to cause solids particles collected by the second group of particle separators to slide down the second portion of the floor in the downstream direction.

37. An improved CFB reactor or combustor arrangement having impact type particle separators for separating solids particles from a flow of flue gas/solids flowing through a reactor enclosure of the CFB reactor, comprising:

a reactor enclosure having an exit opening;

a group of at least two rows of staggered impact type particle separators located upstream of the exit opening with respect to the flow of flue gas/solids;

a second group of at least two rows of staggered impact type particle separators located downstream of the exit opening;

a floor inclined at an angle $\alpha$ with respect to horizontal located below the second group of particle separators; and flue gas/solids deflector means associated with the particle separators to reduce reentrainment of collected solids particles, wherein the flue gas/solids deflector means includes a plate having a lip at an upper portion thereof, a substantially horizontal baffle extending from the plate, and standoff means for securing the plate to a rear wall of the reactor enclosure at a location proximate to an intersection of the floor and the rear enclosure wall.

38. An improved CFB reactor or combustor arrangement having impact type particle separators for separating solids particles from a flow of flue gas/solids flowing through a reactor enclosure of the CFB reactor, comprising:

a reactor enclosure having an exit opening;

a group of at least two rows of staggered impact type particle separators located upstream of the exit opening with respect to the flow of flue gas/solids;

a second group of at least two rows of staggered impact type particle separators located downstream of the exit opening;

a floor inclined at an angle $\alpha$ with respect to horizontal located below the second group of particle separators; and flue gas/solids deflector means associated with the particle separators to reduce reentrainment of collected solids particles, wherein the flue gas/solids deflector means includes an arrangement of plate secured to lower ends of the impact type particle separators.

* * * * *